(12) United States Patent
Kin et al.

(10) Patent No.: US 6,893,559 B2
(45) Date of Patent: May 17, 2005

(54) SYSTEM AND METHOD FOR REMOVING ORGANIC COMPOUNDS FROM WASTE WATER BY OXIDATION

(75) Inventors: Kon-Tsu Kin, Hsinchu (TW); Pei-Lin Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 128 days.

(21) Appl. No.: 10/310,863

(22) Filed: Dec. 6, 2002

(65) Prior Publication Data

US 2003/0106855 A1 Jun. 12, 2003

(30) Foreign Application Priority Data

Dec. 12, 2001 (TW) .................................... 90130831 A

(51) Int. Cl.[7] .............................. C02F 1/32; C02F 1/78
(52) U.S. Cl. ................... 210/195.1; 210/198.1
(58) Field of Search ........................... 210/748, 760, 210/765, 194, 195.1, 198.1, 205

(56) References Cited

U.S. PATENT DOCUMENTS

| | | | | |
|---|---|---|---|---|
| 5,427,693 A | * | 6/1995 | Mausgrover et al. | 210/739 |
| 5,512,178 A | * | 4/1996 | Dempo | 210/638 |
| 5,547,590 A | * | 8/1996 | Szabo | 210/748 |
| 5,709,799 A | * | 1/1998 | Engelhard | 210/748 |
| 5,711,887 A | * | 1/1998 | Gastman et al. | 210/748 |
| 6,096,219 A | * | 8/2000 | Green et al. | 210/695 |
| 6,132,629 A | * | 10/2000 | Boley | 210/760 |
| 6,267,895 B1 | * | 7/2001 | Engelhard et al. | 210/748 |
| 6,365,048 B1 | * | 4/2002 | Masten et al. | 210/610 |

* cited by examiner

*Primary Examiner*—Frank M. Lawrence
(74) *Attorney, Agent, or Firm*—Bacon & Thomas

(57) ABSTRACT

The present invention relates to a process and a system for processing waste water containing organic compounds. The system includes a UV/ozone oxidation removal module, or one or more removal modules connected in series whereas such a serial connection can be continuous or discontinuous. A UV/ozone oxidation removal module mainly includes an ozone generator, an ozone injector, an ozone dissolution tank, an ozone decomposition device, a UV reaction tank, a recycling pipeline. The efficiency of the UV/ozone oxidation removal module is controlled by the recycling ratio, the ozone concentration, and the intensity of UV light.

6 Claims, 5 Drawing Sheets

SYSTEM AND METHOD FOR REMOVING ORGANIC COMPOUNDS FROM WASTE WATER BY OXIDATION

FIELD OF THE INVENTION

The present invention relates to the oxidation removal of organic compounds from the waste water generated by industrial processes related to the fabrication of semiconductor devices, LCDs, etc., particularly to a process and a device for removing organic compounds from a waste water by oxidation by injecting ozone into the waste water and irradiating the water with UV light.

BACKGROUND OF THE INVENTION

Due to its geographical environment, Taiwan area has an insufficient amount of water and has difficulty in developing new water resources. In the mean time, the amount of water use in different sectors increases continuously by the year. Particularly, the expansion in the semiconductor production capacity increases the water consumption in multiples. As a result, the companies in the Science Parks in the Taiwan area face a severe pressure on water shortage and water restriction. This makes the maladjustment of water resources become a noticeable problem. Presently, the Hsin Chu Science Park demands a newly built semiconductor process to have a water recovery ratio (recycling from the discharged water to the ultra-pure water system and other secondary water use system) of more than 85%. The required water recovery ratio for an existing plant is more than 70%. The developing Tainan Science Park demands the semiconductor plants in the park to have an overall water recovery ratio of more than 85%. Therefore, the advocacy of recovery and reuse for the process water is of great urgency.

The total organic carbon (TOC) is used as one of the indexes in the recovery of waste water in a semiconductor process. The main reason for this lies in that more than 90% of the micro contamination affecting the yield of a semiconductor process and a LCD process comes from organic compounds. The organic compounds contained in the process waste water include isopropanol (IPA), N-methyl-2-pyrrolidone (NMP), etc. Only waste water with a TOC value lower than the TOC recovery threshold will be selected to be sent to an organic compound removal system or recycled without a further treatment. On the contrary, waste water with a TOC value higher than the TOC recovery threshold will be discharged. Currently, the TOC recovery threshold is about 0.5~5 ppm. However, at this limit, the plants face a problem of a recovery ratio lower than 70%. In order to increase the recovery ratio, the industry proposes to increase the TOC recovery threshold to increase the amount of waste water entering the organic compound removal system and increase the recovery ratio to more than 70%. However, if the TOC recovery threshold is increased, the organic removal techniques (e.g. activated carbon adsorption, reverse osmosis filtration, bio-bed filtration, etc.) used by the industry will lose their functions due to the limits of the techniques which are in the range of 0.5~5 ppm. In an activated carbon adsorption technique, the competitive adsorption/desorption reactions of the active carbon will cause the processed water having a too wide variation of the water quality. In a reverse osmosis filtration technique, the TOC removal ratio is low and bacteria are liable to grow. And in a bio-bed filtration technique, functions of the bio-bed are liable to be lost due to a large fluctuation of the water quality. Having their existing technical bottlenecks in need of being solved, the abovementioned techniques are helpless in the treatment of waste water with a higher content of organic compounds, and can not achieve the demand of increasing the process recovery ratio. This is a huge blow to an industry which faces an ever increasing water consumption due to the construction of new plants to achieve an economical production scale while facing a tight domestic water supply and difficulties in creating new water resources. Moreover, a UV/Ozone high level oxidation method has long been used to successfully removing organic compounds. It can completely oxidize organic compounds into $CO_2$. This is different from a physical treatment method (e.g. activated carbon adsorption, reverse osmosis filtration, etc.) where the organic compounds are isolated in a certain area of the system such that the ultra-pure water system faces a potential of being re-contaminated. Moreover, the performance of a UV/Ozone high level oxidation method has been rather stable and is far higher than that of a biological treatment method. So far UV/Ozone has not been successfully and effectively applied on the removal of high concentration of organic compounds from waste water of the semiconductor and LCD processes. Thus, the present invention tries to develop such a system.

The following table discloses the comparisons between the present invention and prior arts in terms of functions, measures and results:

| U.S. Pat. No. | Time | Inventor | Description of patent | Description of differences with the present invention |
|---|---|---|---|---|
| 4,792,407 | 1988 | Zeff et al. | Combining ozone, UV and $H_2O_2$ in treating methylene chloride, methanol and halogen-containing material in underground water, industrial waste water, and drinking water. | The present invention adds no $H_2O_2$ and uses UV/ozone to treat waste water discharged from semiconductor and LCD processes. And the organic compounds to be treated are different. |
| 4,849,114 | 1989 | | | |
| 4,863,608 | 1989 | Kawai et al. | The prior arts remove a minute amount of TOC in water or disclose a treatment unit in an ultra-pure water treatment facility. The treatment process mainly comprises a photo-catalyzed reaction | The present invention uses a UV/ozone process to treat the waste water discharged by semiconductor and LCD production processes that has a higher concentration of TOC than that of the |
| 5,302,356 | 1994 | | | |
| 5,395,522 | 1995 | Shadman et al. | | |
| 5,868,924 | 1999 | | | |
| 6,030,526 | 2000 | Melanson et al. Nachtman et al. Porter | | |

| U.S. Pat. No. | Time | Inventor | Description of patent | Description of differences with the present invention |
|---|---|---|---|---|
| | | | and uses a coating of TiO$_2$, SrTiO$_3$ or Pt, Pd, Ru, RuO$_2$ and Rh and an irradiation of a UV lamp to decompose organic compounds. | prior arts in the left column. Moreover, the process and device used are different. |
| 4,990,260 | 1991 | Pisani | Uses a cavitation device and a UV reactor to treat water for industrial cleaning and treat water with water quality of 18 MΩ-cm, dissolved inorganic solid material of 1 ppt and TOG of 100 ppb to TOC of 10 ppb. | The present invention uses a UV/ozone process. |
| 5,573,662 | 1996 | Abe et al. | Treats waste water with a low TOC (TOC:0.5~3 ppm) to <1 ppb. The treatment process comprises RO, vacuum stripping, low pressure UV reactor and mixing bed. | The present invention uses a UV/ozone process. |

SUMMARY OF THE INVENTION

The main objective of the present invention is to provide an oxidation removal process and an oxidation removal device for treating waste water from semiconductor and LCD processes by injecting ozone into the waste water and radiating the waste water with a UV light.

An oxidation removal module constructed according to the present invention for treating waste water containing organic compounds comprises:

an ozone injector adapted to be separately connected to a pump for feeding to-be-treated water, and an ozone generator, wherein said ozone injector is used to mix said to-be-treated water with an ozone source gas from said ozone generator;

an ozone dissolution tank for receiving a resulting ozone/waste water mixture from said ozone injector and providing a residence time for ozone to perform an oxidation reaction with the organic compounds in said to-be-treated water;

a UV reaction tank for receiving an ozone-containing waste water from said ozone dissolution tank and radiating said ozone-containing waste water with a UV light to enable the organic compounds in the waste water to undergo a photo-chemical oxidation;

an optional auxiliary purification element, which is a membrane treatment element, an ion exchange element, an activated carbon adsorption element, or a degassing element, for further purifying an effluent discharged from the UV reaction tank; and a recycling mechanism, which comprises a recycling pipeline for recycling a portion of the effluent from the UV reaction tank, or an effluent from said auxiliary purification element, if said auxiliary purification element exists, to a stream of said to-be-treated water; an outlet pipeline for guiding the other portion of said effluent to a next stage; and one or more valves for controlling the flow rate ratio between the portion of the effluent recycled and the other portion of the effluent discharged to the next stage.

Preferably, said recycling mechanism comprises a flow control valve located on said outlet pipeline; another flow control valve located on said recycling pipeline; and a check valve installed at a location prior to said recycling pipeline entering the stream of said to-be-treated water for preventing said to-be-treated water from entering said recycling pipeline.

Preferably, said module of the present invention further comprises a constant pressure valve connected to a top of said ozone dissolution tank, a gas-liquid separator, and an ozone decomposition device connected to said gas-liquid separator, wherein said constant pressure valve maintains a constant pressure in said ozone dissolution tank and discharges a mixture containing ozone and moisture to said gas-liquid separator when the pressure is higher than a set value, wherein said gas-liquid separator is used for water/gas separation and preventing water from entering said ozone decomposition device.

The present invention also provides a system for removal of organic compounds from waste water by oxidation, which comprises a plurality of the abovementioned modules connected in series and, optionally, one or more auxiliary purification elements connected in series between two adjacent modules, wherein said auxiliary purification element is a membrane treatment element, an ion exchange element, an activated carbon adsorption element, or a degassing element, for further treating an effluent from a previous stage.

The present invention also provides an oxidation removal method for removing organic compounds from waste water, which comprises the following steps:

a) mixing a to-be-treated water with an ozone source gas to form a mixture with an ozone concentration of 3–100 ppm;

b) introducing the ozone/waste water mixture from Step (a) into an ozone dissolution tank to perform an ozone dissolution and oxidation reaction for a residence time of 10–150 seconds;

c) allowing the resulting ozone-treated water from said ozone dissolution tank to flow through a UV reaction tank wherein the ozone-treated water receives a UV radiation such that the organic compounds in the ozone-treated water undergoes a photochemical oxidation; and d) discharging a portion of the resulting UV-radiated water from said UV reaction tank to a next treatment stage, and recycling the remaining portion of the UV-radiated water to be a portion of said to-be-treated water in Step (a), wherein the flow rate ratio of the recycled water to the discharged water is 0.5:1–20:1.

DETAILED DESCRIPTION OF THE INVENTION

An oxidation removal module 13 for removing organic compounds from waste water according to a preferred embodiment of the present invention is shown in FIG. 1, wherein a pump 1 draws in to-be-treated water to an ozone injector 2. The ozone injector 2 sucks in a gas and mixes it with water, and is made of a material resistant to the corrosion of ozone. Through the adjustment of the pump 1 and a flow control valve 9, an ozone gas at a different flow rate can be sucked in. The ozone gas is generated by an ozone generator 3 and is provided to the ozone injector 2. Subsequently, the ozone/waste water mixture mixed by the ozone injector 2 enters an ozone dissolution tank 4, which provides time and space for contact of the gas. The ozone dissolution tank 4 is made of 316 L stainless steel material or other ozone-resistant material. A constant pressure valve 5 maintains the ozone dissolution tank at a specified pressure, and discharges ozone higher than the specified pressure to a gas-liquid separator 6, and is further connected to an ozone decomposition device 7. The gas-liquid separator 6 can separate moisture and ozone gas, and avoid water from entering the ozone decomposition device 7. The objective of the ozone decomposition device 7 is to decompose the ozone in the discharged gas. The waste water flows out through the ozone dissolution tank 4, and then enters the UV reaction tank 8 to undergo a UV radiation oxidation reaction. The UV lamp in the tank can initiate a photochemical oxidation reaction in the water flowing through the tank. In the present embodiment, a medium pressure mercury lamp is used. In practice, a low pressure mercury lamp or a high pressure mercury lamp can also be used. The flow control valve 9 is installed at the outlet of the UV reaction tank 8, thereby controlling the outlet pressure at the rear end of the ozone injector 2. A recycling pipeline 10 is connected to the flow control valve 9, and recycles a portion of the treated water to a location upstream of the pump 1 to merge with the untreated waste water, thereby diluting the TOC concentration in water and increasing the residence time of the waste water. A check valve 11 is installed on the recycling pipeline before reaching the pump 1 to prevent the untreated waste water from entering the recycling pipeline. Another flow control valve 12 is installed on the recycling pipeline 10, thereby controlling the ratio of the recycled flow to the discharged flow. The recycling ratio, (recycling ratio)_=_ (recycled water flow rate)_:_(discharged water flow rate), | of the system is controlled at 0.5:1~20:1.

FIG. 2 shows a variation 15 where a purification element 14 is installed in the oxidation removal module 13 shown in FIG. 1. The water discharged from the flow control valve 9 enters the purification element 14, e.g. a membrane treatment element, an ion-exchange element, an activated carbon adsorption element, a degassing element, etc., in order to remove the ionic matters and the particulate matters in water or generated by the oxidation reaction, or the over-saturated gas generated in the dissolution process.

FIG. 3 shows a system 17 serially connected with N UV/ozone oxidation removal modules, wherein the UV/ozone oxidation removal modules are the module 13 shown in FIG. 1. The water storage tank 16 collects the waste water containing organic compounds discharged from a process. From the water storage tank 16, the waste water enters the first UV/ozone oxidation removal module 13 where the dissolved ozone concentration and the recycling ratio are controlled at the optimal operating conditions of the abovementioned oxidation reaction to reduce the TOC concentration. Subsequently, the waste water enters the second UV/ozone oxidation removal module 13 to perform the oxidation removal reaction. The same operation is repeated N times in order to reduce the TOC concentration in the process waste water below a required TOC concentration, wherein N is a positive integer.

FIG. 4 shows a system 18 where N UV/ozone oxidation removal modules are discontinuously connected in series. From the water storage tank 16, a process waste water containing organic compounds enters M UV/ozone oxidation removal modules 13 where the dissolved ozone concentration and the recycling ratio are controlled at the optimal operating conditions of the abovementioned oxidation removal reactions to reduce the TOC concentration. Subsequently, the waste water flows through several identical or different purification elements 14 (e.g. a membrane treatment element, an activated carbon adsorption element, an ion-exchange element, a degassing element, etc.), which are different from the UV/ozone oxidation removal module, and then flows through N UV/ozone oxidation removal modules 13 in order to reduce the TOC in the process waste water below a required TOC concentration, wherein M and N are positive integers.

FIG. 5 shows a system 19 where several UV/ozone oxidation removal modules 13 are discontinuously connected. From the water storage tank 16, the process waste water enters a first UV/ozone oxidation removal module 13, and a purification element 14 (e.g. a membrane treatment element, an activated carbon adsorption element, an ion-exchange element, a degassing element, etc.) which is not the UV/ozone oxidation removal module, and then enters a second UV/ozone oxidation removal module 13. The abovementioned procedure is repeated N times to reduce the TOC in the process waste water to a required TOC concentration, wherein N is a positive integer.

EXAMPLE 1

A module as shown in FIG. 1 was used to carry out an organic oxidation removal experiment in a waste water containing a TOC of IPA of about 18600 ppb.

The ozone concentration in the ozone/waste water mixture in the ozone injector was maintained at 20 ppm, and the pressure differential was 2.8 kg/cm$^2$. The residence time in the ozone dissolution tank was 41 seconds. The flow ratio of the recycled water to the discharged water was controlled at 4:1. The TOC value in the discharge water was reduced to 12250 ppb, with a removal rate of 34%. The discharge water was again treated by repeating the abovementioned procedure, and the TOC value thereof was reduced from 12250 ppb to 7840 ppb, with a removal rate of 36%. A further treatment on the discharge water of 7840 ppb by repeating the abovementioned procedure successfully reduced the TOC value to 4468 ppb, with a removal rate of 43%. Thus, when the waste water was repeated treated by the abovementioned procedure, the TOC value thereof can be reduced below a desired concentration. The UV/ozone oxidation removal modules could be connected in series continuously or discontinuously, i.e. another purification element that was not a UV/ozone oxidation removal module could be inserted between two adjacent modules.

EXAMPLE 2

The experimental steps of Example 1 were repeated, with the influent being changed to a waste water containing a TOC of NMP of about 10053 ppb. The TOC of the influent was first reduced to about 6700 ppb, with a removal rate of 33%, and then to about 3820 ppb, with a removal rate of 43%. Thus, when the waste water was repeated treated by the abovementioned procedure, the TOC value thereof could be reduced below a desired concentration. The UV/ozone oxidation removal modules could be connected in series continuously or discontinuously, i.e. a purification element that was not the UV/ozone oxidation removal module could be inserted between two adjacent modules.

Figure 1:
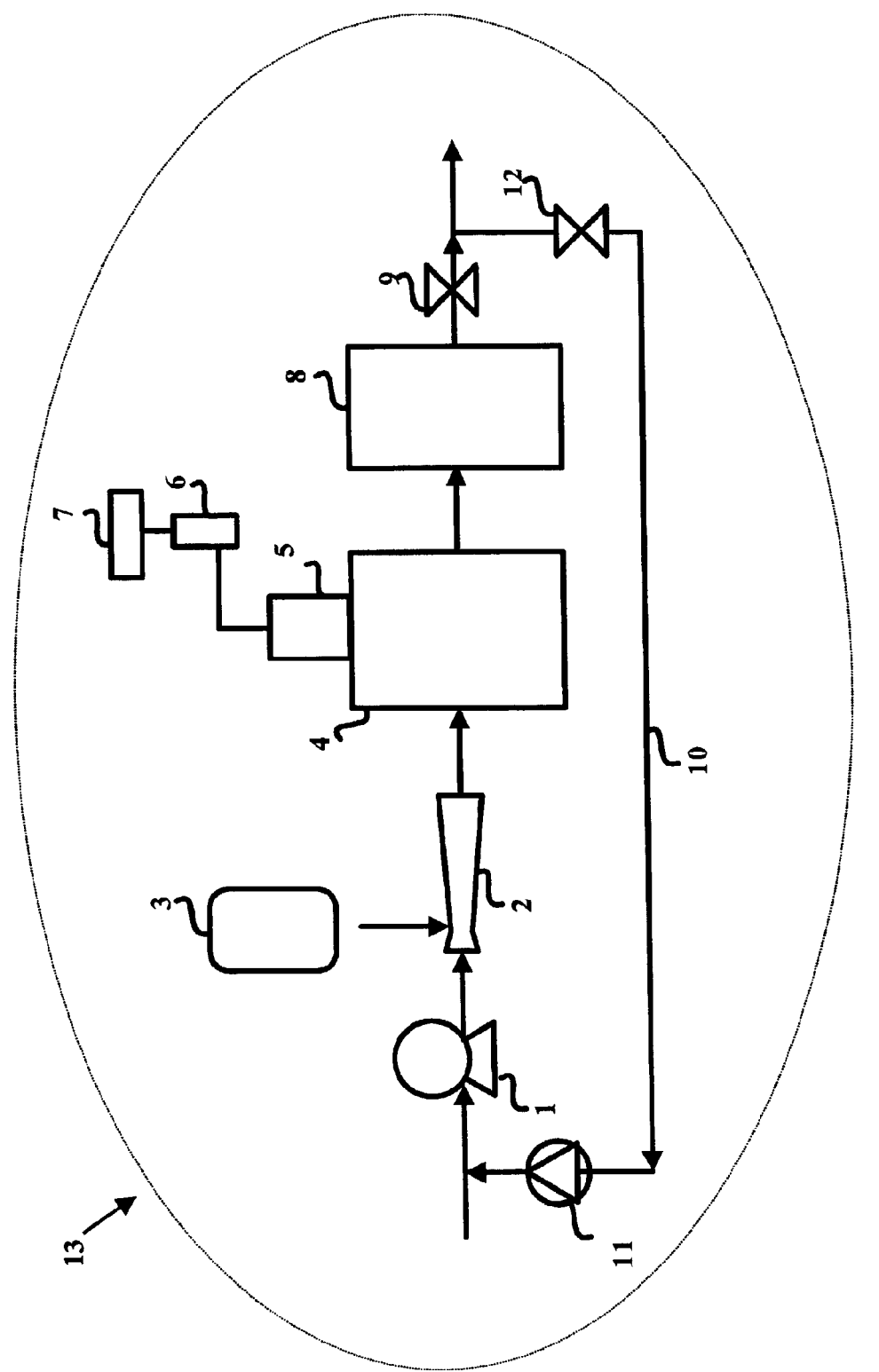
FIG. 1 shows a block diagram of an oxidation removal module 13 for removing organic compounds from waste water in a preferred embodiment according to the present invention.
Figure 2:
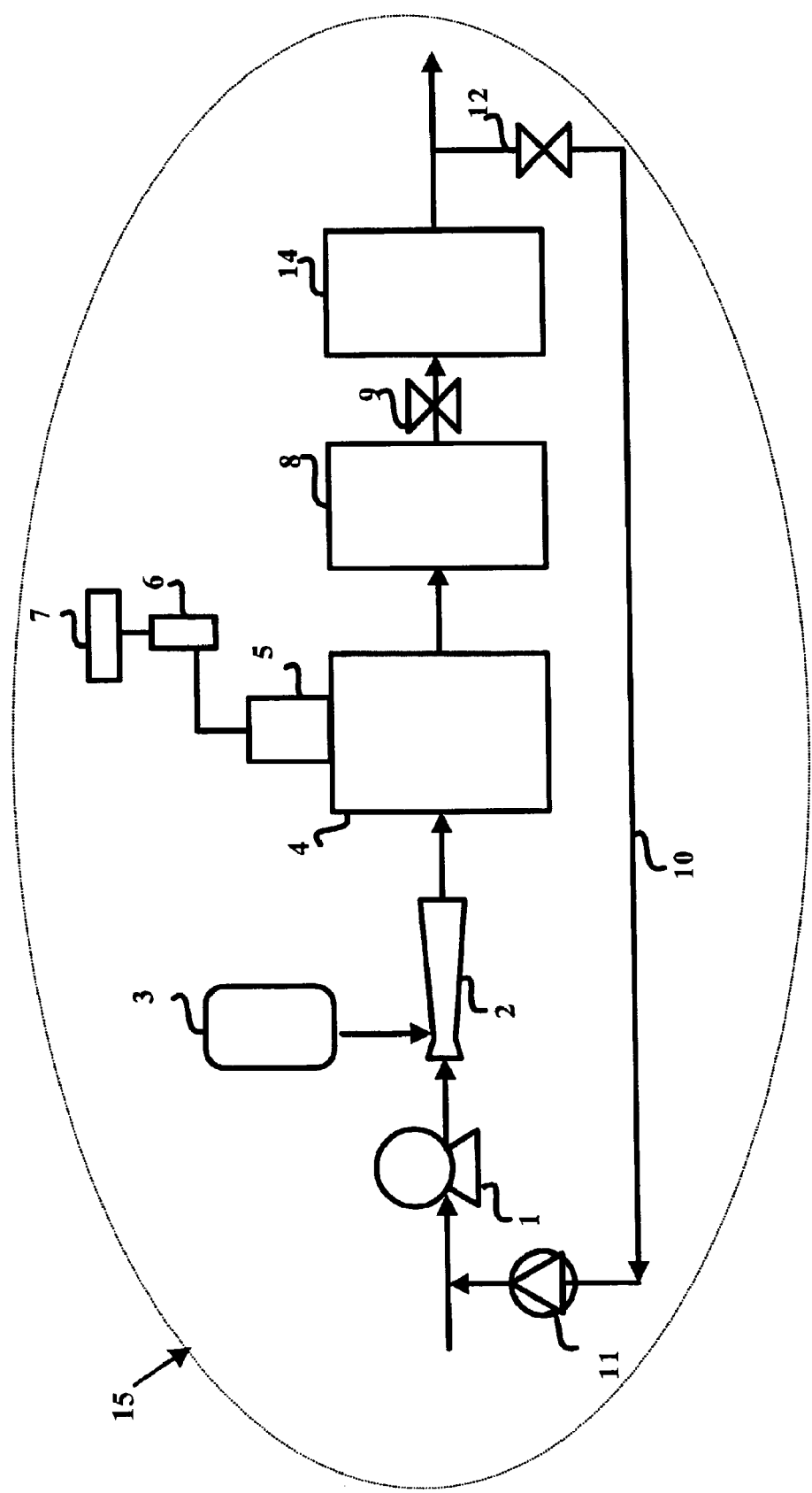
FIG. 2 shows a block diagram of an oxidation removal module 15 for removing organic compounds from waste water in another preferred embodiment according to the present invention.
Figure 3:
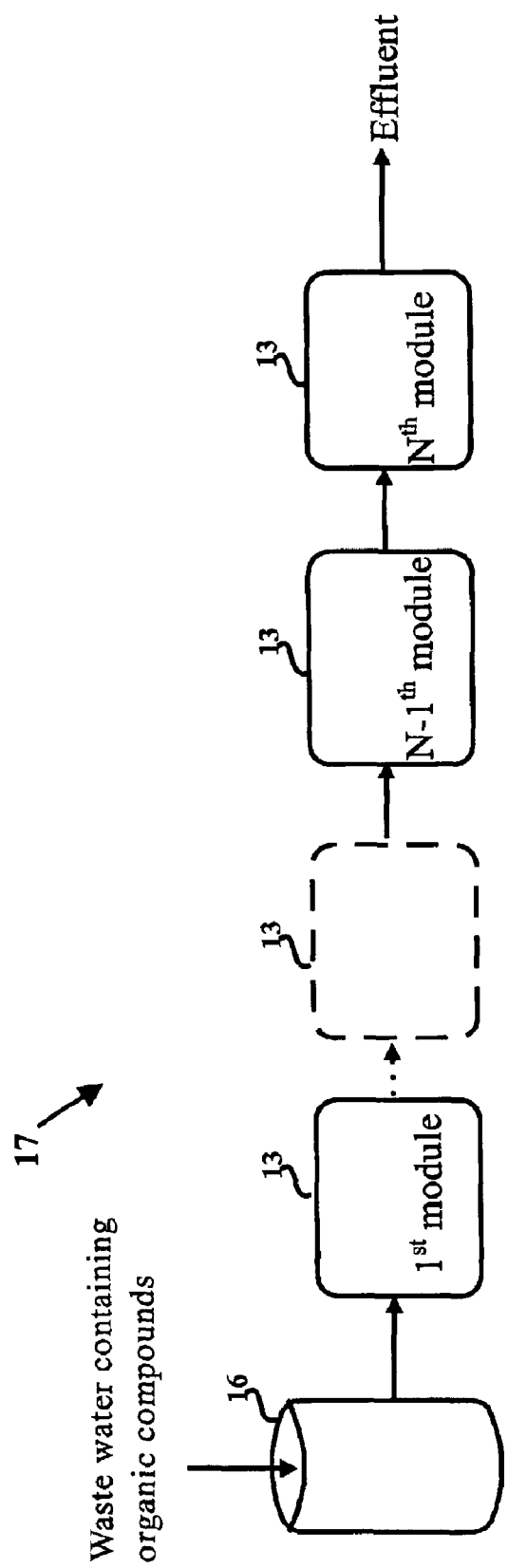
FIG. 3 shows a block diagram of a system 17 of N UV/ozone oxidation removal modules connected in series according to the present invention, wherein the UV/ozone oxidation removal modules are the module 13 shown in FIG. 1.
Figure 4:
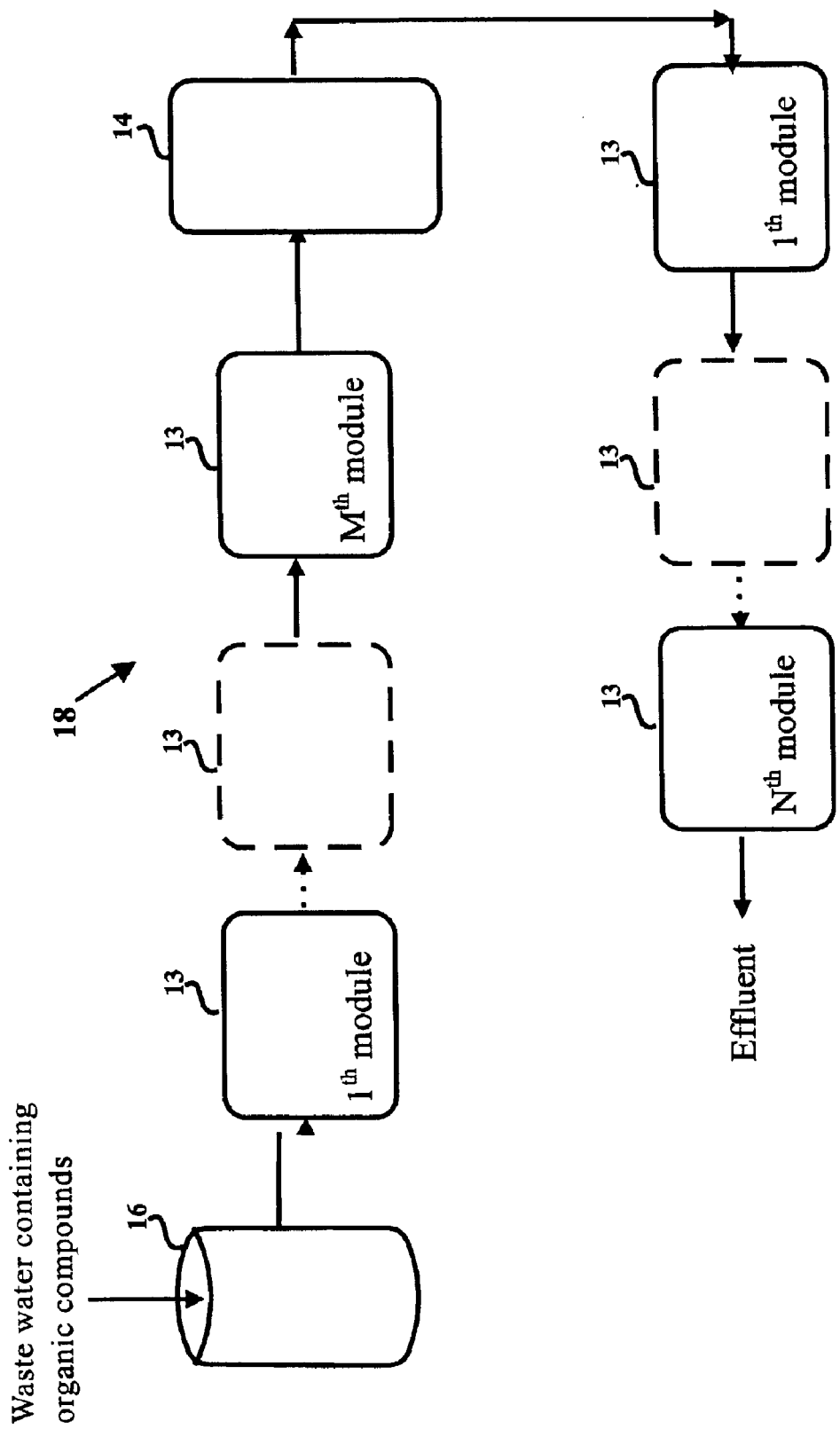
FIG. 4 shows a block diagram of a system 18 of (N+M) UV/ozone oxidation removal modules connected in series according to the present invention, wherein an auxiliary purification element 14 is inserted.
Figure 5:
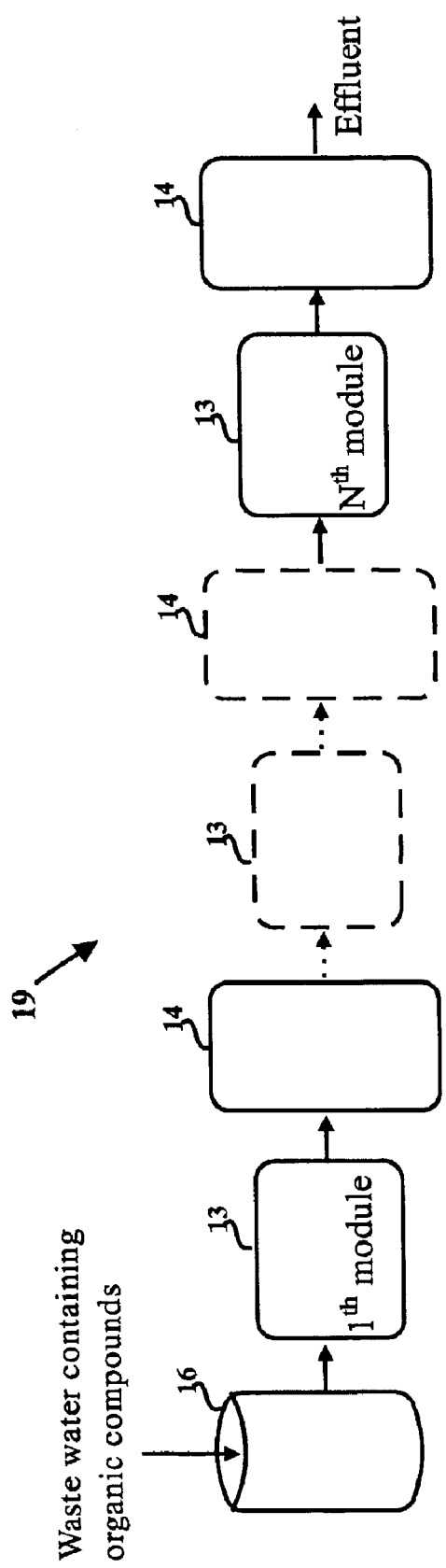
FIG. 5 shows a block diagram of a system 19 of several discontinuously-connected UV/ozone oxidation removal modules according to the present invention, wherein an auxiliary purification element 14 is inserted between two adjacent modules 13.

Legends:
1. pump 2. ozone injector 3. ozone generator 4. ozone dissolution tank 5. constant pressure valve 6. gas-liquid separator 7. ozone decomposition device 8. UV reaction tank 9,12. flow control valve 11. check valve 10. recycling pipeline 14. auxiliary purification element 13,15. oxidation removal module for removing organic compounds from waste water 16. water storage tank 17,18,19. oxidation removal system for removing organic compounds from waste water.

What is claimed is:

1. An oxidation removal module for treating waste water containing organic compounds comprising:

an ozone injector adapted to be separately connected to a pump for feeding to-be-treated water, and an ozone generator, wherein said ozone injector is used to mix said to-be-treated water with an ozone source gas from said ozone generator;

an ozone dissolution tank for receiving a resulting ozone/waste water mixture from said ozone injector and providing a residence time for ozone to perform an oxidation reaction with the organic compounds in said to-be-treated water;

a UV reaction tank for receiving an ozone-containing waste water directly from said ozone dissolution tank and radiating said ozone-containing waste water with a UV light to enable the organic compounds in the waste water to undergo a photo-chemical oxidation;

an optional auxiliary purification element, which is a membrane treatment element, an ion exchange element, an activated carbon adsorption element, or a degassing element, for further purifying an effluent discharged from the UV reaction tank; and a recycling mechanism, which comprises a recycling pipeline for recycling a portion of the effluent from the UV reaction tank, or an effluent from said auxiliary purification element, if said auxiliary purification element exists, to a stream of said to-be-treated water; an outlet pipeline for guiding the other portion of said effluent to a next stage; and one or more valves for controlling the flow rate ratio between the portion of the effluent recycled and the other portion of the effluent discharged to the next stage.

2. The module as claimed in claim 1, wherein said recycling mechanism comprises a flow control valve located on said outlet pipeline; another flow control valve located on said recycling pipeline; and a check valve installed at a location prior to said recycling pipeline entering the stream of said to-be-treated water for preventing said to-be-treated water from entering said recycling pipeline.

3. The module as claimed in claim 1 further comprising a constant pressure valve connected to a top of said ozone dissolution tank, a gas-liquid separator, and an ozone decomposition device connected to said gas-liquid separator, wherein said constant pressure valve maintains a constant pressure in said ozone dissolution tank and discharges a mixture containing ozone and moisture to said gas-liquid separator when the pressure is higher than a set value, wherein said gas-liquid separator is used for water/gas separation and preventing water from entering said ozone decomposition device.

4. A system for removal of organic compounds from waste water by oxidation comprising a plurality of modules as defined in claim 1 connected in series and, optionally, further comprising one or more auxiliary purification elements connected in series between two adjacent modules of said plurality of modules, wherein said auxiliary purification element is a membrane treatment element, an ion exchange element, an activated carbon adsorption element, or a degassing element, for further treating an effluent from a previous stage in said plurality of the modules or said one or more auxiliary purification elements.

5. The system as claimed in claim 4, wherein said recycling mechanism comprises a flow control valve located on said outlet pipeline; another flow control valve located on said recycling pipeline; and a check valve installed at a location prior to said recycling pipeline entering the stream of said to-be-treated water for preventing said to-be-treated water from entering said recycling pipeline.

6. The system as claimed in claim 4 further comprising a constant pressure valve connected to a top of said ozone dissolution tank, a gas-liquid separator, and an ozone decomposition device connected to said gas-liquid separator, wherein said constant pressure valve maintains a constant pressure in said ozone dissolution tank and discharges a mixture containing ozone and moisture to said gas-liquid separator when the pressure is higher than a set value, wherein said gas-liquid separator is used for water/gas separation and preventing water from entering said ozone decomposition device.

* * * * *